US006590154B1

(12) United States Patent
Badey et al.

(10) Patent No.: US 6,590,154 B1
(45) Date of Patent: Jul. 8, 2003

(54) ACCESSORY FOR FIXING A WIRE CABLE TRAY, AND WIRE CABLE TRAY EQUIPPED WITH AT LEAST SUCH AN ACCESSORY

(75) Inventors: Claude Badey, Bois Colombes (FR); James Deciry, Compiegne (FR)

(73) Assignee: Metal Deploye S.A., Montbard (FR)

( * ) Notice: Subject to any disclaimer, the term of this patent is extended or adjusted under 35 U.S.C. 154(b) by 0 days.

(21) Appl. No.: 10/019,944

(22) PCT Filed: Jun. 9, 2000

(86) PCT No.: PCT/FR00/01607

§ 371 (c)(1),
(2), (4) Date: May 8, 2002

(87) PCT Pub. No.: WO01/03266

PCT Pub. Date: Jan. 11, 2001

(30) Foreign Application Priority Data

Jul. 6, 1999 (FR) .......................................... 99 08693

(51) Int. Cl.[7] .......................................... H02G 3/04

(52) U.S. Cl. .......................... 174/48; 174/135; 174/49; 211/26

(58) Field of Search .......................... 174/48, 49, 135, 174/19, 60, 99 R; 248/41, 49, 58, 225.21; D13/155; 254/389; 211/26, 68.1, 181.1; 52/677, 696, 712

(56) References Cited

U.S. PATENT DOCUMENTS 5,384,937 A * 1/1995 Simon .................... 211/181.1
5,531,410 A * 7/1996 Simon .................... 248/49
5,899,041 A * 5/1999 Durin .................... 211/181.1
5,927,658 A * 7/1999 Gerster .................... 248/49
6,193,434 B1 * 2/2001 Durin et al. ................ 403/309
6,239,364 B1 * 5/2001 Nickel .................... 174/48
6,311,732 B1 * 11/2001 Nickel .................... 211/181.1
6,401,939 B1 * 6/2002 Durin .................... 211/26
6,402,418 B1 * 6/2002 Durin et al. ................ 403/309

FOREIGN PATENT DOCUMENTS

EP 0 390 668 10/1990
FR 2 766 897 2/1999

* cited by examiner

*Primary Examiner*—Dean A. Reichard
*Assistant Examiner*—Angel R. Estrada
(74) *Attorney, Agent, or Firm*—Young & Thompson

(57) ABSTRACT

An accessory, called fixing accessory, designed to be fixed by elastic pinching, locally to wire cable tray includes, in meshed form, wires (11,12) of two different types, namely, longitudinal wires (11) and, set transversely at various spots along the longitudinal wires (11), U-shaped transverse wires (12), the assembly globally forming, as for a wireway, three panels (13,14), namely, a base panel (13) and two side panels (14). The fixing accessory (16) being designed to be mounted on any one of the panels (13,14), includes fixing elements whereby it is to be made integral with the panel (13,14) which it equips, and at least one bore (26,27) running right through it which it is capable of receiving any particular fixing element, such as a clamping ring, bolt or the like: the fixing accessory (16) includes, for forming its fixing elements, one first fixing surface (22), designed to be engaged beneath at least a wire (11,12) and a second fixing surface facing the first fixing surface (22), and designed to bear on at least two wires (11,12) of the same type as the wire (11,12).

32 Claims, 2 Drawing Sheets

ACCESSORY FOR FIXING A WIRE CABLE TRAY, AND WIRE CABLE TRAY EQUIPPED WITH AT LEAST SUCH AN ACCESSORY

The present invention relates generally to wire cable trays.

Existing wire cable trays include, in mesh form, wires of two different types, namely, on the one hand, longitudinal wires, usually called warp wires, which run, longitudinally, in rectilinear or quasi rectilinear manner, over the full length of the tray, and, on the other hand, disposed transversely from place to place along these longitudinal wires, and appropriately attached thereto, U-shaped transverse wires, usually called weft wires, the combination globally forming three panels, in practice plane or substantially plane panels, namely a bottom panel and two lateral panels, usually called flanges.

These wire cable trays are routinely used, in the manner of a trough, to support, house and protect elongate members such as electrical cables or the like, or even tubes, for instrumentation or fluid transport, for example.

By electrical cables is meant here, and hereinafter, not only cables for transporting and distributing electrical power but also cables and fibers for transmitting information by electrical, optical or other means.

In everything that follows, to facilitate the description, electrical cables will be referred to; however, everything that is stated with regard to electrical cables is of course valid for any elongate member.

With regard to electrical cables, wire cable trays have many advantages for which they are appreciated by electrical installers, and in particular the advantages of easy installation, and therefore of economy, of flexibility, because electrical cables can be led out through any of their meshes, of transparency, and therefore of identifying the electrical cables, of ventilation, of cleanliness, of safety, both for the electrical cables and for users, and of performance.

However, at present, fixing electrical cables to one or other of their panels, which is necessary for holding the electrical cables in place, and which is effected in practice with the aid of cable ties looped transversely around one or the other of their longitudinal wires, gripping one or more of the electrical cables, is not always totally satisfactory.

One reason for this is that their wires necessarily cross each other at different levels, the longitudinal wires being in practice on the outside of the transverse wires.

As a result of this, if they are insufficiently rigid, the electrical cables follow the corresponding changes in level.

In fact, it is frequently possible to observe that the electrical cables are subject to an undulating deformation, especially in the case of electrical cables of relatively small diameter.

Apart from the fact that this undulating deformation might sometimes be considered as unesthetic, it can also prejudice the service life of the electrical cables and/or the quality of their performance.

This applies in particular to capillary internal wiring electrical cables for networks for interconnecting data processing hardware, in which the diameter of the electrical conductors is only a few tenths of a millimeter.

Also, regardless of the nature and/or the diameter of the electrical cables, the cable ties holding them in place can move unintentionally along the longitudinal wire they are wrapped around, and as a result of this the holding of the electrical cables in place is not fully controlled.

A general object of the present invention is an arrangement that avoids these drawbacks and has other advantages.

To avoid those drawbacks, there has already been proposed, in particular in the document WO 99/06746, a wire cable tray of the kind including, in mesh form, wires of two different types, namely, on the one hand, longitudinal wires, which run longitudinally the whole of its length, and, on the other hand, disposed transversely from place to place along said longitudinal wires, and appropriately attached thereto, U-shaped transverse wires, the combination forming, globally, in the manner of a trough, three panels, namely, a bottom panel and two lateral panels, said wire cable tray being equipped locally, on any of its panels, with at least one accessory, referred to herein purely for convenience as a fixing accessory, including, on the one hand, attachment means by means of which it is adapted to be fastened to the panel that it equips, and, on the other hand, at least one hole that passes completely through it and by means of which it is adapted to receive any fixing member, such as a clip, bolt, etc.

A first advantage of the above fixing accessory is to furnish the electrical cables, at any location chosen by the installer, with a more extended support than that provided by a single wire, the fixing accessory taking the general form of a plate and thereby offering the electrical cables an advantageously plane support.

With this kind of fixing accessory, whether it straddles one of the longitudinal wires, more generally one of the outside wires, or is inserted into one of the meshes that the latter form with the transverse wires, more generally the inside wires, its free surface is level with the generatrix of the inside wires farthest away from the outside wires, with no difference in level relative thereto.

Thus undulating deformation of the electrical cables between their successive supports is advantageously avoided.

According to the above document, the fixing accessory includes, in a cruciform arrangement, to constitute its attachment means, on the one hand, a first attachment surface, through which it bears on at least one outside wire, and, on the other hand, a second attachment surface, which faces toward the first attachment surface and by which it is engaged under at least two inside wires.

An object of the present invention is to propose a cable tray of the above kind in which the fixing accessory can be attached to the cable tray via two wires of the cable tray that are parallel and of the same type, namely two longitudinal wires or two transverse wires, as a result of which the fixing accessory is easy to manufacture.

Thus, in accordance with the invention, a fixing accessory, intended to be fixed locally, by elastic clamping, to a cable tray of the above kind, includes, to constitute its attachment means, on the one hand, a first attachment surface, which is intended to be engaged under at least one wire, and, on the other hand, a second attachment surface, which faces toward the first attachment surface and is intended to bear on at least two wires of the same type as said wire.

The fixing accessory in accordance with the invention simply attaches to the wire cable tray that it equips of its own accord, by way of a simple clipping action, gripping at least one wire of the cable tray, without any other auxiliary fixing means or member.

Additionally, the fixing accessory is advantageously removable, so that it can be demounted and recovered, if required.

Furthermore, the fixing accessory according to the invention is advantageously locked in position on the wire cable tray it equips, as much transversely as longitudinally, as is, likewise and advantageously, through its intermediary, the fixing member or members it receives.

In particular, thanks to this fixing accessory, the cable ties used to hold the electrical cables in position are advantageously immobilized longitudinally on the wire cable tray, with the benefit of improved and enduring control of the retention of the electrical cables.

However, over and above the facility offered in this way of using these cable ties, the fixing accessory according to the invention has other advantages.

In particular, in the same manner as the accessory described in the document previously cited, it is possible, if required, to install, parallel to each other, inside the wire cable tray, two separator angle-irons defining a separate compartment inside the wire cable tray, which can be used with advantage to house particular electrical cables, especially if they must be provided with a metallic shield, and which may require to be closed by a cover.

The fixing accessory according to the invention can equally be used with advantage with hangers from which the assembly is suspended or brackets supporting it.

As a general rule, the fixing accessory can further be used to fix mechanical or electrical devices whose fixing part does not correspond to the geometry of a mesh of the wire cable tray, in particular by virtue of being smaller than the latter.

The accessory advantageously has a U-shaped section with a core and two flanges, the core including a groove parallel to the flanges, the bottom of the groove being on the same side of the core of the U-shape as the flanges.

The first attachment surface preferably includes a tongue, referred to as an attachment tongue, parallel to the groove and defined by a U-shaped cut-out formed at least in the bottom of the groove.

The U-shaped cut-out is advantageously also formed in the edges of the groove, to a depth substantially equal to the diameter of the wire under which the attachment tongue is engaged.

The second attachment surface is preferably divided between at least two attachment surfaces situated on respective opposite sides of an attachment tongue and each formed on each of the flanges of the fixing accessory.

The second attachment surface advantageously includes a notch, referred to as an attachment notch, formed in the edge of at least one flange.

The attachment notch is preferably disposed in line with the portion of the attachment tongue near its root.

The attachment tongue is advantageously elastically deformable and each attachment notch is advantageously flanked by an access ramp.

The base of each access ramp preferably includes a notch, referred to as a locating notch.

In a preferred embodiment, the fixing accessory includes two attachment tongues, each associated with a pair of attachment surfaces.

The accessory advantageously includes at least two holes of different types, namely at least one circular hole and at least one oblong hole.

The accessory preferably takes the general form of a plate.

The accessory advantageously has a rectangular contour.

The accessory according is preferably made of sheet metal.

The invention also provides a wire cable tray equipped with the above fixing accessory.

The wire cable tray is advantageously equipped with a plurality of fixing accessories, at least some of which are aligned, staggered from place to place along its length.

The longitudinal wires are advantageously on the outside of the transverse wires and the first attachment surface of the fixing accessory is advantageously engaged under two longitudinal wires.

The features and advantages of the invention will emerge from the following description, which is given by way of example and with reference to the accompanying diagrammatic drawings, in which.

Figure 1:
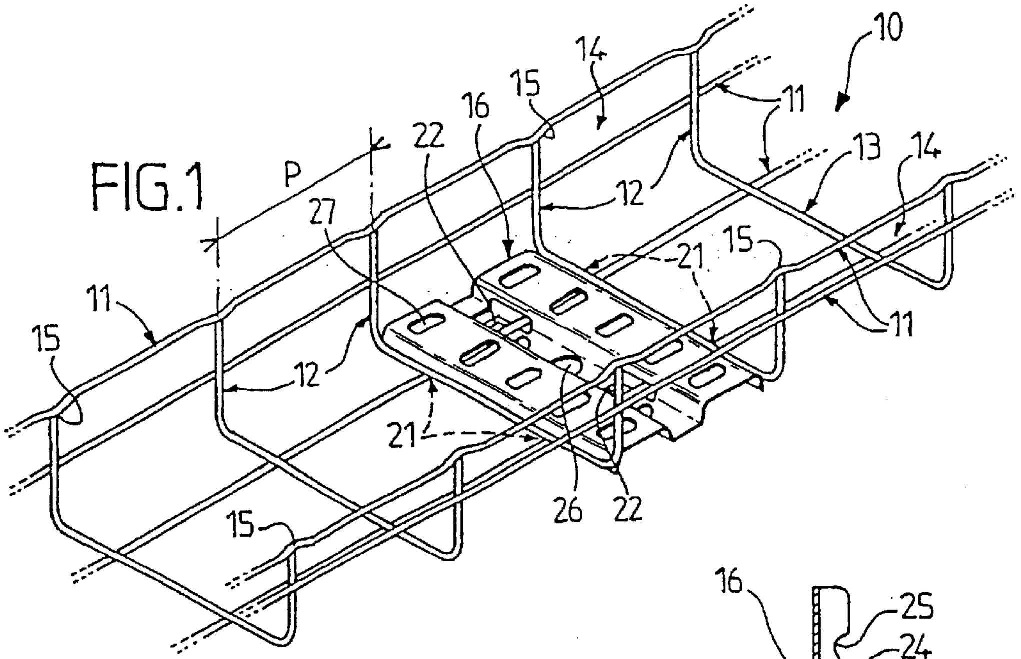
FIG. 1 is a perspective view of a wire cable tray equipped with a fixing accessory according to the invention.
Figure 2:
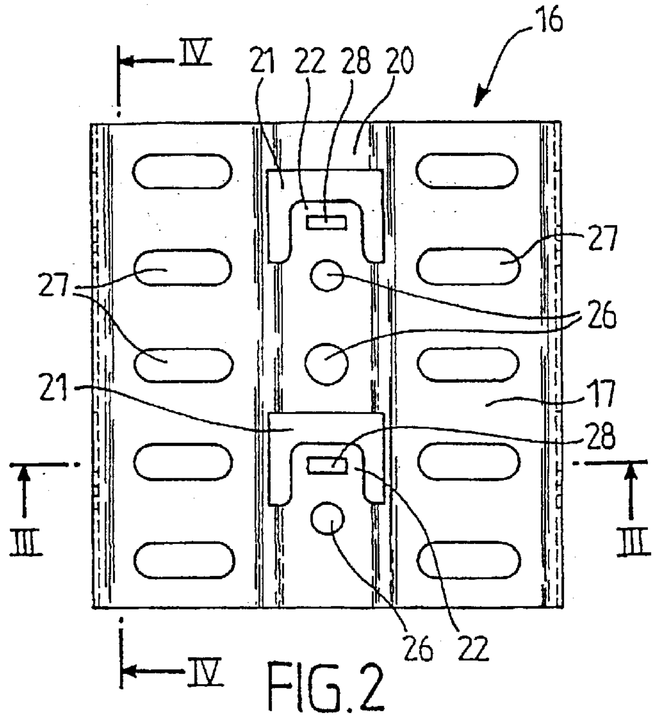
FIG. 2 is a plan view to a larger scale of the fixing accessory shown in FIG. 1.
Figure 3:
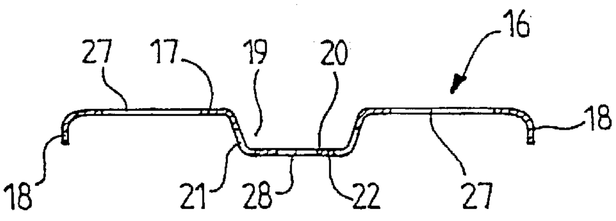
FIG. 3 is a view in section taken along the line III—III in FIG. 2.
Figure 4:
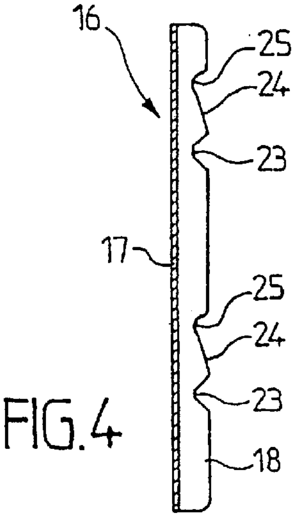
FIG. 4 is a view in section taken along the line IV—IV in FIG. 2.
Figure 5:
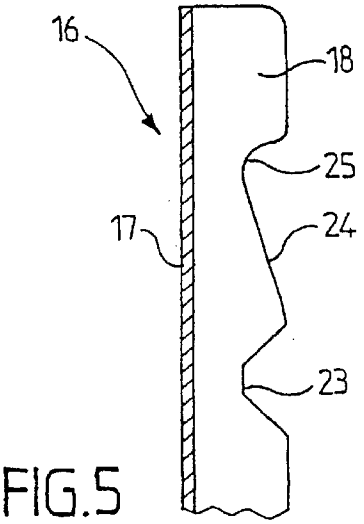
FIG. 5 shows part of FIG. 4 to a larger scale.

As shown in the figures, the overall aim is to equip a wire cable tray 10.

As is known in the art, the wire cable tray 10 includes, in mesh form, wires 11, 12 of two different types, namely, on the one hand, longitudinal wires 11, which run, longitudinally, in rectilinear or substantially rectilinear manner, over the whole of its length, and, on the other hand, disposed transversely from place to place, at a regular pitch P, along the longitudinal wires 11, to which they are appropriately attached, U-shaped transverse wires 12, the combination forming, globally, in the manner of a trough, three panels 13, 14, namely a bottom panel 13 and two lateral panels 14.

In practice the wires 11, 12 are metal wires, to be more precise steel wires, and they are attached together where they cross each other by welding.

By construction, the wires 11, 12 cross at different levels.

In practice, the longitudinal wires 11 are at a lower level and the transverse wires 12 are at a higher level.

In other words, the longitudinal wires 11 are on the outside of the transverse wires 12.

In the embodiment shown, all the wires 11, 12 are round wires.

In other words, they all have a circular cross section.

For example, and as shown, the diameter of their cross section is the same for all of them, but this is not necessarily always the case.

Other shapes for the section of the wires are possible: square, rectangular, round with flats, polygonal or otherwise; here the concept of diameter therefore encompasses that of the width or thickness of the wire, depending on the shape of its section.

In the embodiment shown, the bottom panel 13 includes two longitudinal wires 11 and, for each pitch P, the longitudinal wires 11 delimit, with the corresponding transverse wires 12, one mesh.

However, as previously, the number of longitudinal wires 11 that the bottom panel 13 includes and thus the number of meshes that they form for each pitch P can be different.

In the embodiment shown, each of the lateral panels 14 includes only two longitudinal wires 11, namely an intermediate longitudinal wire 11 substantially half way up its height and an edge longitudinal wire 11.

However, as before, the number of longitudinal wires 11 can be different.

In particular, like the bottom panel 13, the lateral panels 14 can form meshes the same size as the meshes of the bottom panel 13 or a different size.

In the embodiment shown, the edge longitudinal wire 11 of the lateral panels 14 includes, from place to place, at the pitch P, undulations 15 in which it is abutted against the transverse wires 12, but this is not necessarily always the case.

As shown in FIG. 1, the wire cable tray 10 is intended to support, house and protect electrical cables, and fixing members, in this instance cable ties, are used to hold the electrical cables in place.

In accordance with the invention, the wire cable tray 10 is locally equipped, on any one of its panels 13, 14, and, in this instance, in the embodiment shown, on its bottom panel 13, with one or more accessories 16, referred to herein as fixing accessories, including, on the one hand, as described in more detail later, attachment means, by means of which it is fastened to the panel 13, 14 that it equips, in this instance the bottom panel 13, and, on the other hand, one or more holes 26, 27 that pass completely through it and by means of which it is adapted to receive any kind of fixing member, for example, in the case of a hole 27, a cable tie.

Of course, the wire cable tray 10 can be equipped with a plurality of fixing accessories 16, at least some of which are aligned, staggered from place to place along its length.

All the fixing accessories 16 employed are preferably identical.

Thus only one of them will be described here.

In the embodiment shown, the fixing accessory 16 takes the general form of a sheet metal plate cut and bent into a U-shaped section having a core 17 and two flanges 18; in its central region, the core 17 has a longitudinal groove 19, i.e. parallel to the flanges 18; the bottom 20 of the groove 19 is on the same side of the core 17 as the free edge of the flanges 18.

The bottom 20 of the groove 19 in the core 17 of the fixing accessory 16 has U-shaped cut-outs 21, here two such cut-outs 21, defining attachment tongues 22 parallel to the groove 19 and one face of which constitutes the first attachment surface; in the embodiment shown, the cut-outs 21 also extend partly into the flanks of the groove 19, which here are inclined.

The attachment tongues 22 are associated with attachment notches 23 formed in the edge of the flanges 18; the attachment notches 23 are advantageously disposed transversely to the groove 19, in line with the portion of the corresponding attachment tongue 22 close to its root; the edge surface of the attachment notches 23, which faces toward the first attachment surface, constitutes the second attachment surface; as can be seen in the drawings, each attachment tongue 22 is associated with two attachment notches 23, each formed in one of the flanges 18.

The width of the fixing accessory 16 as measured transversely to the groove 19 is very slightly less than the pitch P; in other words, neglecting the assembly clearance, it corresponds to the distance between two transverse wires 12, so that it can be disposed, as can be seen in the figures, on the bottom panel 13 of the cable tray 10, between two transverse wires 12; its length, which is the same as that of the groove 19, advantageously corresponds globally to the width of the cable tray 10.

Figure 10:
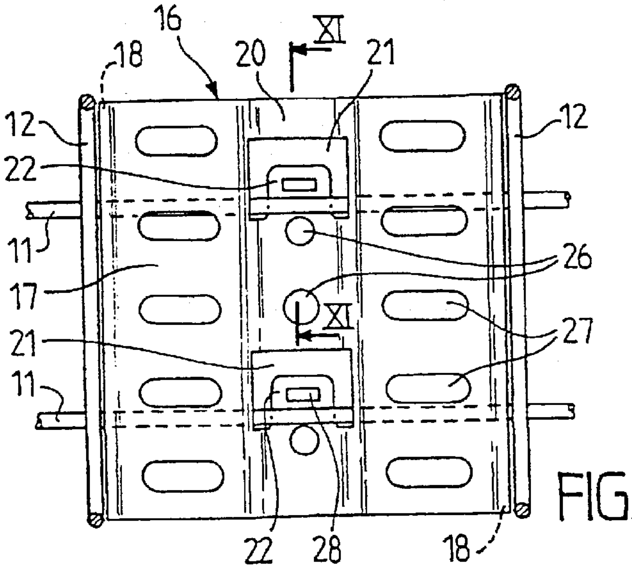
FIG. 10 is analogous to FIGS. 6 and 8 and shows the final fitting of the accessory.
Figure 11:
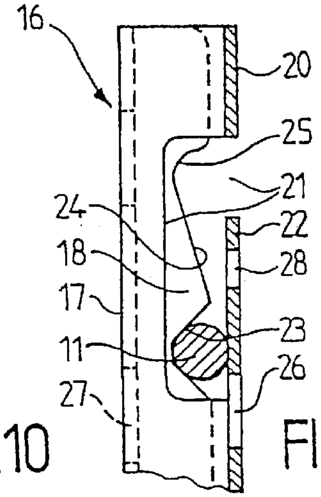
FIG. 11 is a view in section taken along the line XI—XI in FIG. 10.

FIGS. 10 and 11 illustrate the attachment of the fixing accessory 16 to the cable tray 10: the two longitudinal wires 11 of the bottom panel 13 of the cable tray 10 are gripped, so to speak sandwiched, between, on the one hand, each attachment tongue 22 and, on the other hand, the bottom of the attachment notches 23 associated with each attachment tongue 22; here, the attachment notches 23 are of trapezoidal shape, closely matching the section of the longitudinal wires 11.

Thus the fixing accessory 16 is held in place in all directions relative to the cable tray 10 by its attachment means.

To facilitate placing the fixing accessory 16 in its position shown in FIGS. 10 and 11, it is preferable for each attachment notch 23 to be flanked by an access ramp 24, the base of which includes a locating notch 25.

The locating notch 25 is in line with the core of the U-shape of the U-shaped cut-out defining the attachment tongue 22, as a result of which there is free access to the locating notch 25, the attachment tongues 22 not extending over the locating notches 25.

Figure 6:
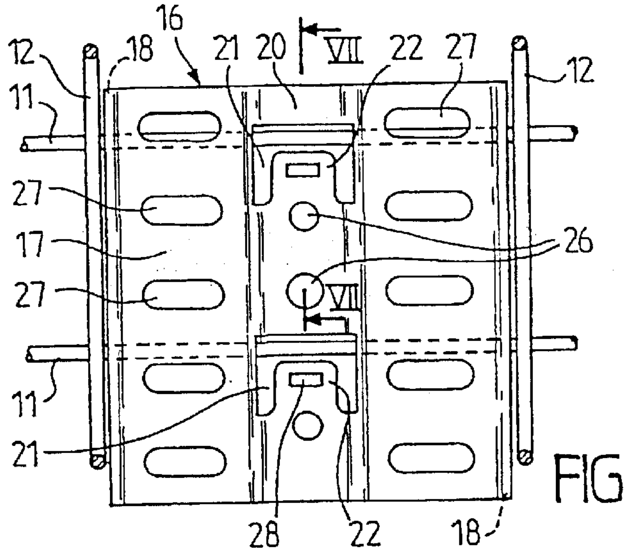
FIG. 6 is a plan view showing the first phase of fitting an accessory according to the invention to a wire cable tray that it is to equip.
Figure 7:
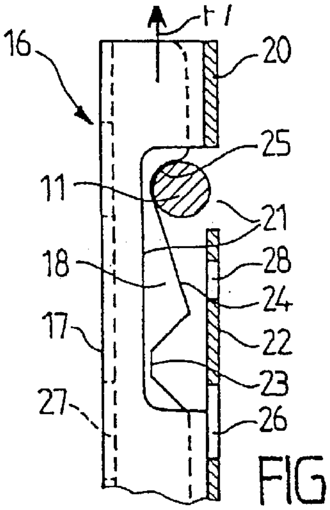
FIG. 7 is a view in section taken along the line VII—VII in FIG. 6.

The two cut-outs in each flange 18, defining the notches 23 and 25 separated by the access ramp 24, and likewise the attachment tongues 22, are offset parallel to the groove 19 by a distance equal to the transverse distance between two longitudinal wires 1; then, by placing the fixing accessory 16 on the bottom panel 13 of the cable tray 10, see FIGS. 6 and 7, the locating notches 25 naturally cap the longitudinal wires 11; the fixing accessory 16 according to the invention straddles two longitudinal wires 11 and the bottom of its locating notches 25 therefore rest against those longitudinal wires 11.

Figure 8:
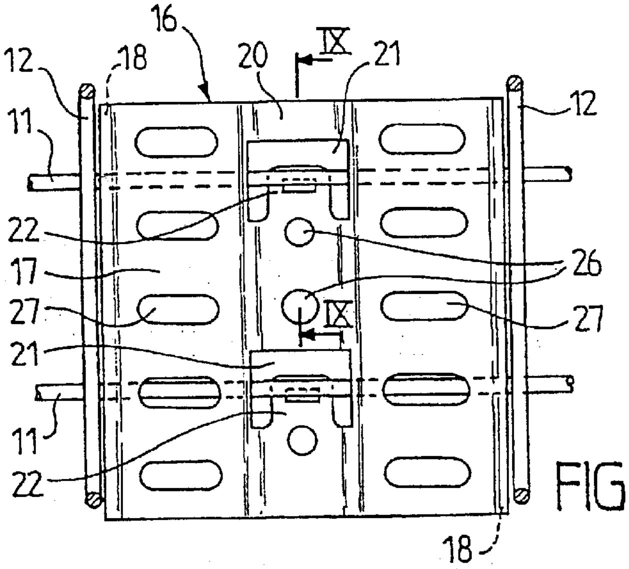
FIG. 8 is analogous to FIG. 6 and shows an intermediate phase.
Figure 9:
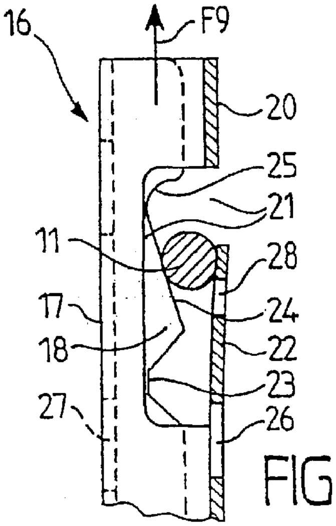
FIG. 9 is a view in section taken along the line IX—IX in FIG. 8.

It then suffices to move the fixing accessory 16 relative to the cable tray 10 along the transverse wires 12 concerned, in the direction of the arrow F7 in FIG. 7; thanks to the shape of the longitudinal wires 11, which here are cylindrical, the attachment tongues 22 rise up said wires 11 while the latter move down the access ramp 24; during this movement, shown in FIGS. 8 and 9, the attachment tongues 22 are raised elastically; the ramps 24 and the tongues 22 clamp and thus sandwich the longitudinal wires 11; on sliding further in the direction of the arrow F9 in FIG. 9, the longitudinal wires 11 pass over the ramps 24 and drop into the attachment notches 23, which advantageously locks the combination onto the wiring cable tray 10 in a releasable manner.

The fixing accessory 16 according to the invention can be removed by a process that is the opposite of the above process, and the accessory is therefore advantageously removable.

For improved attachment, if required, the attachment tongues 22 can be wrapped partly around the wires 11 using a tool such as a screwdriver, passed through the rectangular opening 28 at their end.

By construction, the fixing accessory 16 according to the invention preferably has a conformation such that it is advantageously at substantially the same level as the transverse wires 12.

To support the electrical cables, it suffices to place these fixing accessories 16 from place to place along them.

In the embodiment shown, the fixing accessory 16 according to the invention includes at least two holes 26, 27 of different types, namely at least one circular hole 26 and at least one oblong hole 27.

It is preferable if there are several holes 26 and several holes 27.

For example, the various holes 26, 27 provided in this way are arranged in rows parallel to the flanges 18.

In the embodiment shown, there are thus three rows of holes 26, 27.

The central row, which extends along the center line of the fixing accessory 16 according to the invention, includes, for example, as shown, a hole 26 in its central area and two holes 26 on respective opposite sides of the previous hole and of slightly smaller diameter.

The lateral rows include only holes 27, for example, as shown.

In practice, all the holes 27 are elongate in the transverse direction, i.e. perpendicular to the flanges 18.

To hold the electrical cables in place, it then suffices, at each of the fixing accessories 16, to fasten the electrical cables using one or more cable ties conjointly with the fixing accessory 16, the cable tie or ties passing through the holes 27 in the fixing accessory 16.

The fixing accessories 16 used conjointly can carry at least one angle-iron having a fixing flange which has, from place to place, and at a regular pitch, longitudinally elongate slots through which a fixing member can be passed, in this instance a bolt. To attach them to the wire cable tray 10, they are fastened by bolts to the fixing accessory 16 with which the wire cable tray 10 is equipped in accordance with the invention, using the holes 26 in the fixing accessories 16.

If the elongate members are tubes, the fixing accessories 16 can equally carry self-locking clips, as described in the document WO 94/04861.

It will have been understood that, instead of being attached transversely to the bottom panel of the wire cable tray that they equip, fixing accessories in accordance with the invention can be attached thereto longitudinally; also, they can equally be attached to either of the lateral panels thereof.

The fixing accessory as described is made of sheet metal cut and bent to shape; of course, if desired, it can equally well be made of a synthetic material.

What is claimed is:

1. A fixing accessory intended to be fixed locally, by resilient clamping, to a wire cable tray including, in mesh form, wires (11, 12) of two different types, namely, on the one hand, longitudinal wires (11), which run longitudinally the whole of its length, and, on the other hand, disposed transversely from place to place along said longitudinal wires (11), and attached thereto, U-shaped transverse wires (12), the combination forming, globally, in the manner of a trough, three panels (13, 14), namely, a bottom panel (13) and two lateral panels (14), said fixing accessory (16) being adapted to be mounted on any of said panels (13, 14) and including, on the one hand, attachment means by means of which it is adapted to be fastened to the panel (13, 14) that it equips, and, on the other hand, at least one hole (26, 27) that passes completely through it and by means of which it is adapted to receive a fixing member, the fixing accessory (16) including, to constitute its attachment means, on the one hand, a first attachment surface (22), which is intended to be engaged under at least one wire (11, 12), and, on the other hand, a second attachment )surface (23), which faces toward the first attachment surface (22) and is intended to bear on at least two wires (11, 12) of the same type as said wire (11, 12), wherein said accessory has a U-shaped section with a core (17) and two flanges (18), the core (17) including a groove (19) parallel to the flanges (18), a bottom (20) of the groove (19) being on the same side of the core (17) of the U-shape as the flanges (18).

2. A fixing accessory according to claim 1, wherein the first attachment surface includes an attachment tongue (22) parallel to the groove (19) and defined by a U-shaped cut-out (21) formed at least in the bottom (20) of the groove (19).

3. A fixing accessory according to claim 2, wherein the U-shaped cut-out (21,) is also formed in the sides of the groove (19), to a depth substantially equal to the diameter of the wire (11, 12) under which the attachment tongue (22) is engaged.

4. A fixing accessory according to claim 2, wherein the second attachment surface is divided between at least two attachment surfaces (23) situated on respective opposite sides of the attachment tongue (22) and each formed on each of the flanges (18) of the fixing accessory (16).

5. A fixing accessory according to claim 4, which further includes two attachment tongues (22), each associated with a pair of attachment surfaces (23).

6. A fixing accessory according to claim 2, wherein the second attachment surface includes an attachment notch (23) formed in an edge of at least one flange (18).

7. A fixing accessory according to claim 6, wherein the attachment notch (23) is disposed in line with a portion of the attachment tongue (22) near its root.

8. A fixing accessory according to claim 6, wherein the attachment tongue (22) is elastically deformable and each attachment notch (23) is flanked by an access ramp (24).

9. A fixing accessory according to claim 8, wherein a base of each access ramp (24) includes a locating notch (25).

10. A fixing accessory according to claim 1, which further includes at least two holes (26, 27) of different types, namely at least one circular hole (26) and at least one oblong hole (27).

11. A fixing accessory according to claim 1, in the general form of a plate.

12. A fixing accessory according to claim 1, which has a rectangular contour.

13. A fixing accessory according to claim 1, which is made of sheet metal.

14. A wire cable tray including, in mesh form, wires (11, 12) of two different types, namely, on the one hand, longitudinal wires (11), which run longitudinally the whole of its length, and, on the other hand, disposed transversely from place to place along said longitudinal wires (11), and attached thereto, U-shaped transverse wires (12), the combination forming, globally, in the manner of a trough, three panels (13, 14), namely, a bottom panel (13) and two lateral panels (14), said wire cable tray being equipped with a fixing accessory (16) mounted on any of said panels (13, 14) and including, on the one hand, attachment means by means of which it is fastened to the panel (13, 14) and, on the other hand, at least one hole (26, 27) that passes completely through it and by means of which it is adapted to receive a fixing member, the fixing accessory (16) including, to constitute its attachment means, on the one hand, a first attachment surface (22), which is engaged under at least one wire (11, 12), and, on the other hand, a second attachment surface (23), which faces toward the first attachment surface (22) and bears on at least two wires (11, 12) of the same type as said wire (11, 12).

15. A wire cable tray according to claim 14, wherein the second attachment surface is divided between at least two attachment surfaces (23) situated on respective opposite sides of the first attachment surface (22).

16. A wire cable tray according to claim 15, wherein said fixing accessory has a U-shaped section with a core (17) and two flanges (18), the at least two attachment surfaces constituting the second attachment surface being formed on the two planges.

17. A wire cable tray according to claim 16, wherein said at least one of the at least two attachment surfaces constituting the second attachment surface is an edge of one of said flanges.

18. A wire cable tray according to claim 16, wherein said core (17) includes a groove (19) parallel to the flanges (18), the bottom (20) of the groove (19) being on the same side of the core (17) of the U-shape as the flanges (18), and the first attachment surface includes an attachment tongue (22) parallel to the groove (19) and defined by a U-shaped cutout (21) formed at least in the bottom (20) of the groove (19).

19. A wire cable tray according to claim 16, wherein the attachment tongue (22) is elastically deformable, an edge or edges of said flanges comprising said second attachment surface and having an attachment notch and each attachment notch (23) is flanked by an access ramp (24).

20. A wire cable tray according to claim 14, including a plurality of said fixing accessories (16), at least some of which are aligned, staggered from place to place along its length.

21. A wire cable tray according to claim 14, wherein the longitudinal wires (11) are on the outside of the transverse wires (12) and the first attachment surface (22) of the fixing accessory (16) is engaged under two longitudinal wires (11).

22. A fixing accessory intended to be fixed locally, by resilient clamping, to a wire cable tray including, in mesh form, wires (11, 12) of two different types, namely, on the one hand, longitudinal wires (11), which run longitudinally the whole of its length, and, on the other hand, disposed transversely from place to place along said longitudinal wires (11), and attached thereto, U-shaped transverse wires (12), the combination forming, globally, in the manner of a trough, three panels (13, 14), namely, a bottom panel (13) and two lateral panels (14), said fixing accessory (16) being adapted to be mounted on any of said panels (13, 14) and including, on the one hand, attachment means by means of which it is adapted to be fastened to the panel (13, 14) that it equips, and, on the other hand, at least one hole (26, 27) that passes completely through it and by means of which it is adapted to receive a fixing member, the fixing accessory (16) including, to constitute its attachment means, on the one hand, a first attachment surface (22), which is intended to be engaged under at least one wire (11, 12), and, on the other hand, a second attachment surface (23), which faces toward the first attachment surface (22) and is intended to bear on at least two wires (11, 12) of the same type as said wire (11, 12), where the second attachment surface is divided between at least two attachment surfaces (23) situated on respective opposite sides of the first attachment surface (22) and said accessory has a U-shaped section with a core (17) and two flanges (18) having each an edge on their end, the at least two attachment surfaces (23) constituting the second attachment surface being formed on the two flanges, at least one of said two attachment surfaces being an edge of a flange.

23. A fixing accessory according to claim 22, wherein the first attachment surface includes an attachment tongue (22) parallel to a groove (19) and defined by a U-shaped cut-out (21) formed at least in the bottom (20) of the groove (19) and the U-shaped cut-out (21) is also formed in the sides of the groove (19), to a depth substantially equal to the diameter of the wire (11, 12) under which the attachment tongue (22) is engaged.

24. A fixing accessory according to claim 22, wherein the second attachment surface includes an attachment notch (23) formed in the edge of at least one flange (18).

25. A fixing accessory according to claim 24, wherein the attachment notch (23) is disposed in line with a portion of the attachment tongue (22) near its root.

26. A fixing accessory according to claim 24, wherein the attachment tongue (22) is elastically deformable and said attachment notch (23) is flanked by an access ramp (24).

27. A fixing accessory according to claim 26, wherein a base of said access ramp (24) includes a locating notch (25).

28. A fixing accessory according to claim 22, which further includes two attachment tongues (22), each associated with a pair of attachment surfaces (23).

29. A fixing accessory according to claim 22, which further includes at least two holes (26, 27) of different types, namely at least one circular hole (26) and at least one oblong hole (27).

30. A fixing accessory according to claim 22, in the general form of a plate.

31. A fixing accessory according to claim 30, which has a rectangular contour.

32. A fixing accessory according to claim 22, which is made of sheet metal.

* * * * *